(12) United States Patent
Elliot et al.

(10) Patent No.: US 6,709,327 B2
(45) Date of Patent: Mar. 23, 2004

(54) METHOD FOR CIRCULATING AN AIR FLOW IN A PASSENGER COMPARTMENT BY SOFT DIFFUSION AND DEVICE THEREFOR

(75) Inventors: Gilles Elliot, Courcouronnes (FR); Pascale Petitjean, Neauphle le Vieux (FR); Carine Paumier, Versailles (FR); Guillaume Foury, Elancourt (FR)

(73) Assignee: Valeo Climatisation, La Verrier (FR)

( * ) Notice: Subject to any disclaimer, the term of this patent is extended or adjusted under 35 U.S.C. 154(b) by 58 days.

(21) Appl. No.: 09/959,605
(22) PCT Filed: Mar. 6, 2001
(86) PCT No.: PCT/FR01/00672
§ 371 (c)(1), (2), (4) Date: Oct. 31, 2001
(87) PCT Pub. No.: WO01/66370
PCT Pub. Date: Sep. 13, 2001

(65) Prior Publication Data
US 2002/0160706 A1 Oct. 31, 2002

(30) Foreign Application Priority Data
Mar. 6, 2000 (FR) .............................................. 00 02830

(51) Int. Cl.$^7$ ................................................. B60H 1/26
(52) U.S. Cl. ..................................... 454/121; 454/127
(58) Field of Search ............................... 454/121, 127, 454/152, 156

(56) References Cited

U.S. PATENT DOCUMENTS

| | | | | | |
|---|---|---|---|---|---|
| 4,223,754 | A | * | 9/1980 | Mizuno et al. ............... | 180/90 |
| 5,062,351 | A | * | 11/1991 | Kloster ....................... | 454/127 |
| 5,173,078 | A | * | 12/1992 | Robin et al. ................. | 454/126 |
| 5,518,449 | A | * | 5/1996 | Danieau ....................... | 165/42 |
| 5,524,923 | A | * | 6/1996 | Henseler ................... | 280/728.3 |
| 5,620,366 | A | * | 4/1997 | Munzel et al. ............... | 454/152 |
| 6,004,203 | A | | 12/1999 | Bieri | |
| 6,179,707 | B1 | * | 1/2001 | Arold ......................... | 454/150 |
| 6,257,975 | B1 | * | 7/2001 | Giez ........................... | 454/127 |
| 6,468,491 | B1 | * | 10/2002 | Foury et al. ............. | 423/245.1 |
| 2001/0021634 | A1 | * | 9/2001 | Elliot et al. ................ | 454/121 |

FOREIGN PATENT DOCUMENTS

| | | | |
|---|---|---|---|
| DE | 39 27 217 | * | 8/1990 |
| DE | 199 18 515 | * | 10/2000 |
| EP | 0 707 990 A1 | | 4/1996 |
| EP | 0 713 792 A1 | | 5/1996 |
| GB | 1 040 469 A | | 4/1966 |

* cited by examiner

Primary Examiner—Harold Joyce
(74) Attorney, Agent, or Firm—Liniak, Berenato & White (57) ABSTRACT

The invention concerns a method for reducing preheating time and for homogenizing temperatures in a passenger compartment, for example of a motor vehicle, wherein the preheating dynamics is improved, which consists in adjusting soft air diffusion air speed in an optimized range of values. In one embodiment, the air circulating device comprises at least a ventilator (8) and at least a soft air diffusion conduit (2), having at its open end an air permeable panel (4) which ensures a soft air diffusion in the passenger compartment. The invention is characterized in that the ventilator, the conduit (2) and the panel (4) are dimensioned so that, at maximum ventilated air flow rate, the diffused air speed ranges between 2 and 5 m/s. The device further comprises at least a ventilation conduit (3), said conduit being dimensioned so that, at maximum air flow blown by the ventilator, the air speed at the ventilating nozzles substantially ranges between 2 m/s and 10 m/s. The invention is applicable in particular to a motor vehicle passenger compartment.

18 Claims, 7 Drawing Sheets

METHOD FOR CIRCULATING AN AIR FLOW IN A PASSENGER COMPARTMENT BY SOFT DIFFUSION AND DEVICE THEREFOR

The invention relates to a method of aeration particularly by gentle diffusion, but not exclusively, intended for the aeration of a passenger compartment of a motor vehicle, as well as an aeration device for the implementation of such a method.

The aeration within the passenger compartment of a motor vehicle is usually performed by air blown through a plurality of directional nozzles. These installations exhibit several major drawbacks: they produce air currents, a non-uniform distribution of the temperatures, thermal differences between the front seats and the rear seats of the vehicle, and a sensation of thermal instability. The comfort of the passengers is therefore substantially affected by this.

In order to overcome these problems, a solution called "gentle-diffusion" solution consists in diffusing the air through an air-permeable surface of the dashboard. These surfaces are prepared in the form of porous materials, of a grating or of a large number of holes piercing a surface which is impermeable to air. The patents EP 0 713 792, FR 2 074 471 or U.S. Pat. No. 1,140,469 disclose various embodiments of gentle-diffusion structures.

However, these structures feature air-permeable surfaces which are either too permeable, and the speed of the air at the air-diffusion nozzles associated with the gentle diffusion is then too low, or not permeable enough, in which case the loss of pressure head is too great. In these conditions the dynamic range for temperature regulation of the passenger compartment is too small, while the time taken to regulate the temperature of the vehicle is too long, which detracts from the comfort of the passengers, in particular of the passengers situated in the back.

In order to overcome this problem, the invention proposes to regulate the speed of the gentle-diffusion air in a range of values optimized to allow a layering of the air towards the top of the passenger compartment in such a way as to obtain a uniform atmosphere in the whole passenger compartment.

More precisely, the object of the invention is a method of aeration by gentle diffusion for ventilation, heating and/or air-conditioning of a passenger compartment, in which, at the maximum of the ventilated-air throughput, the proportioning of the diffusion is regulated to even out the diffused air to a speed lying between substantially 1 and 5 m/s, and preferably between substantially 2 m/s and 4 m/s on leaving the diffuser.

According to one particular embodiment, the method consists in combining, with the mode for gentle diffusion of the air, an aeration by directional ventilation. This embodiment makes it possible to have the possibility of adding to the ambient sense of comfort, obtained by making the gentle-diffusion air uniform, an additional sense of comfort by an additional supply of air blown in at various points. Furthermore, in order to control the throughput of air for the aeration, it is proposed to carry out the regulation of this throughput at the location of central control of the aeration, whereas, according to the state of the art, this regulation is carried out at the outlet, at the location of each aeration nozzle. This amounts to regulating the distribution between gentle and directional diffusion upstream of the outlet pipework.

In these conditions, the function of opening/closing of the aerators is no longer necessary, which simplifies the design and the fabrication of the aeration function, bringing a possible financial saving. Furthermore, dispensing with the flap at the final stage of the aeration makes it possible to free the design (the shape) from the technical constraints, facilitating, for example, the matching of the aerators to the shapes of the driver's position. This has the added advantage of allowing a saving of space by dispensing with the knurled regulating wheels, as well as an improvement in the noise level in the passenger compartment.

The invention also relates to a device for aeration of a passenger compartment including at least one fan and at least one duct for gentle diffusion of the air, having at its open end an air-permeable panel which provides for a gentle diffusion of the air in the passenger compartment, and in which the duct and the porosity of the panel are dimensioned so that, at the maximum ventilated-air throughput, the speed of the diffused air lies substantially between the values mentioned above.

The dimensioning relates especially, at maximum ventilation speed, to the aperture at the end of the duct, that is to say the dimensions of the panel and/or the porosity of the latter. The porosity corresponds to the resistance to the passage of air through the panel. This resistance is dependent, especially, on the dimension, the density and/or the shape of the holes.

According to one particular embodiment, the device furthermore includes at least one aeration duct, this duct being dimensioned so that, at the maximum air throughput blown by the fan, the speed of the air at the location of the aeration nozzles lies substantially between 2 m/s and 10 m/s, and preferably substantially between 4 m/s and 8 m/s.

According to other embodiments, the device, intended for a passenger compartment of a motor vehicle equipped especially with glazing, includes at least two air-diffusion ducts suitable for separating an airflow, originating from a common duct situated upstream, into at least two secondary airflows for the gentle diffusion of the passenger compartment and for the de-icing of the windscreen.

In order to reduce the turbulence phenomena, limit the thermal losses and the acoustic reflections and therefore the noise, the output angle $\alpha 1$ of the gentle-diffusion duct (4) with respect to the dashboard advantageously lies between 0° and a maximum value $\alpha 2$ equal to the angle of inclination of the windscreen to the dashboard increased by 30°.

When the device includes at least one aeration duct combined with the gentle-diffusion duct, these ducts are advantageously dimensioned so that the air throughput of the duct for the gentle diffusion of the passenger compartment lies between 50% and 95% of the throughput of the common duct, while the air throughput of the duct or ducts for the aeration lies respectively between 50% and 5% of the throughput of the common duct.

The invention thus makes it possible considerably to improve the comfort of the passengers by achieving a dynamic range of regulation of the temperature of the vehicle, achieving stability of the temperatures, thermal comfort and a particular skin-surface sensation of the air speeds.

According to particular embodiments, with the aeration by directional ventilation being carried out through at least two aeration ducts coupled to the common section, each aeration duct includes a flap for regulating the air throughput, substantially upstream of the outlet. When the aeration ducts divide into secondary ducts, the throughput regulation is carried out by flaps common to the secondary ducts in common-access or separate-access control mode, i.e. by flaps arranged at the inlet of each secondary duct.

In these conditions, a reduced volume is given over to the aerator function with regard to the state of the art which provides flaps at the end of the aeration ducts. Moreover, the arrangement of a flap upstream of the air outlet makes it possible to avoid the variations in orientation of the nozzles and therefore of the airflow at the outlet. Furthermore, this repositioning of the flap in the duct leads to an appreciable acoustic improvement.

Other advantages and characteristics wilt appear on reading which follows [sic], relative to a detailed embodiment of the invention, by reference to the attached drawings which show, respectively.

In the figures, the same reference signs designate elements which are identical or equivalent in structure and in function.

Figure 1:
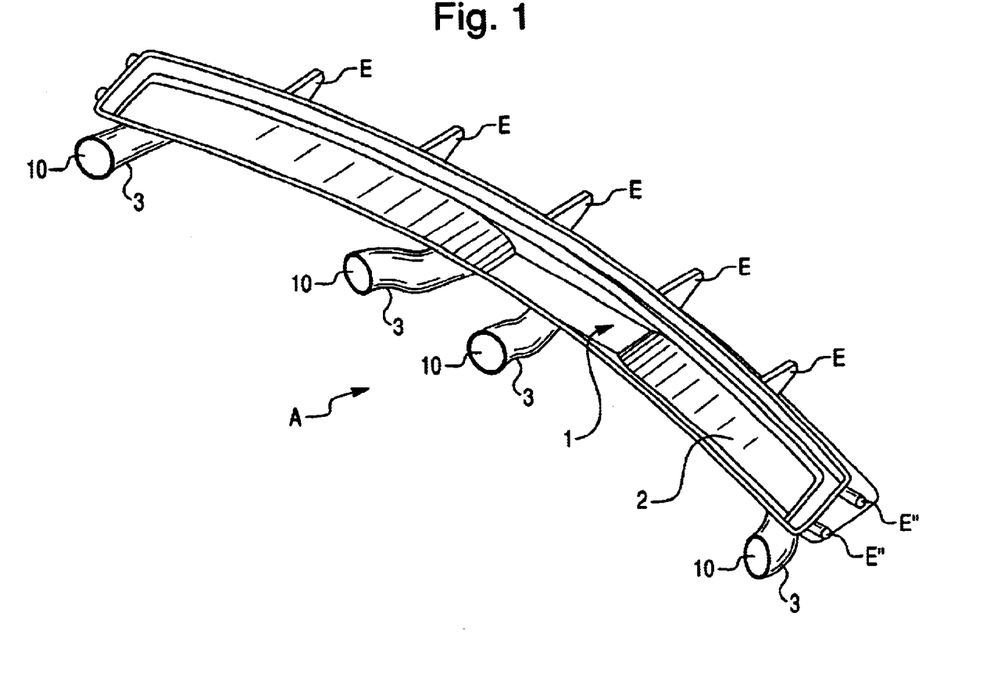
FIG. 1, an upper general view of an example of an aeration device according to the invention.
Figure 2:
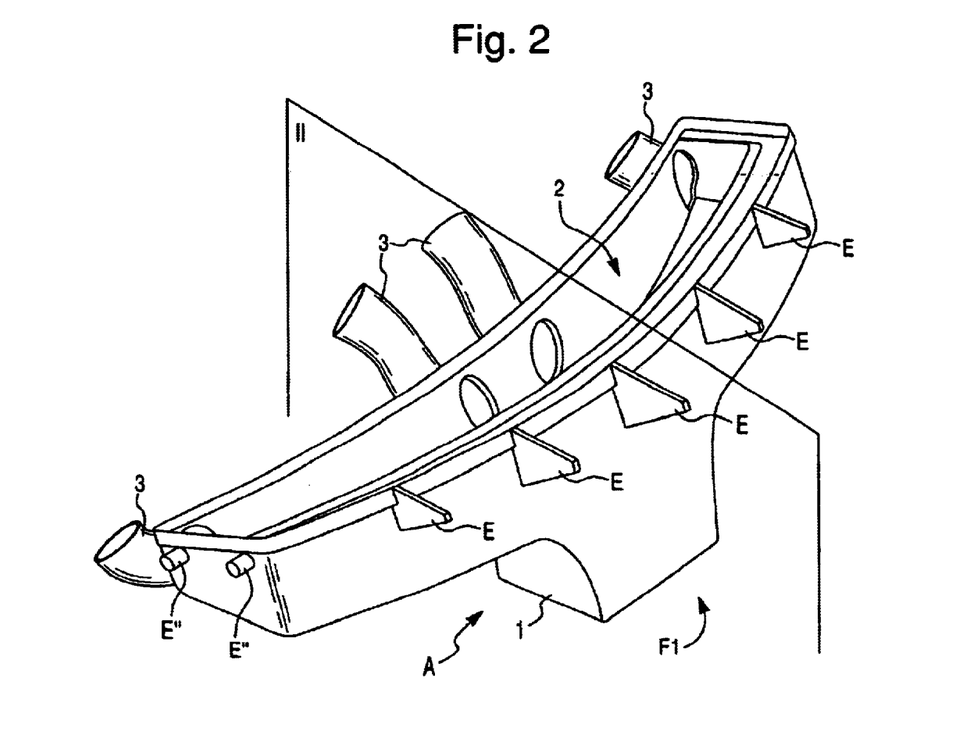
FIG. 2, a front view of the device according to FIG. 1.

Referred to in upper and front views in FIGS. 1 and 2, a vehicle dashboard includes a device A for ventilation, heating and air-conditioning according to the invention comprising a common duct 1 upstream, and an open duct 2 for gentle diffusion of the air in the passenger compartment of the motor vehicle. The air, blown by a fan (not shown), is transmitted along the arrow F1 of the common duct 1 to a panel fixed on the substantially rectangular aperture part of the duct 2 coupled to the duct 1. Such a panel, permeable to air, is intended to ensure a gentle diffusion of the air inside the passenger compartment of the vehicle. Transverse pieces E, E' for positioning of the device A are distributed on its periphery so as to fix this device in a location of the vehicle reserved for this purpose.

The aperture of the duct 2 is dimensioned in length and breadth so that, at a maximum air throughput of about 500 kg/h blown by the fan, the speed of the air at the outlet of the gentle-diffusion panel is of the order of 2 m/s. The material of the panel may also be chosen as a function of its porosity in order to allow a supplementary adjustment of the air speed within the range defined by the present invention, i.e. between 1 and 5 m/s, preferably between 2 and 4 m/s. In these ranges, a good compromise exists between:

on the one hand the non-aggressive character, not disturbing for the skin, of the gentle diffusion, and on the other hand, an acceptable dynamic range of regulation of the temperature of the vehicle, that is to say making it possible to obtain a temperature which is stabilized sufficiently quickly.

In these conditions, a gentle diffusion is ensured, and the dynamic range of regulation of the temperature of the vehicle does not affect the comfort of the passengers and conforms to the specifications from the vehicle manufacturers.

According to the embodiment example illustrated, the device A also includes aeration ducts 3 coupled to the common duct 1 and linked by end apertures to aeration nozzles 10. The aperture of the ducts 3 is dimensioned so that, at maximum air throughput blown by the fan, the speed of the air at the location of the aeration nozzles, equal to 6 m/s in the embodiment example, may lie between 2 and 10 m/s, preferably between 4 and 8 m/s. In the example illustrated, the sum of the areas of the cross sections at the site of each nozzle 10, situated at the end of each of the ducts 3, lies between 0.005 $m^2$ and 0.020 $m^2$.

Figures 3, 4:
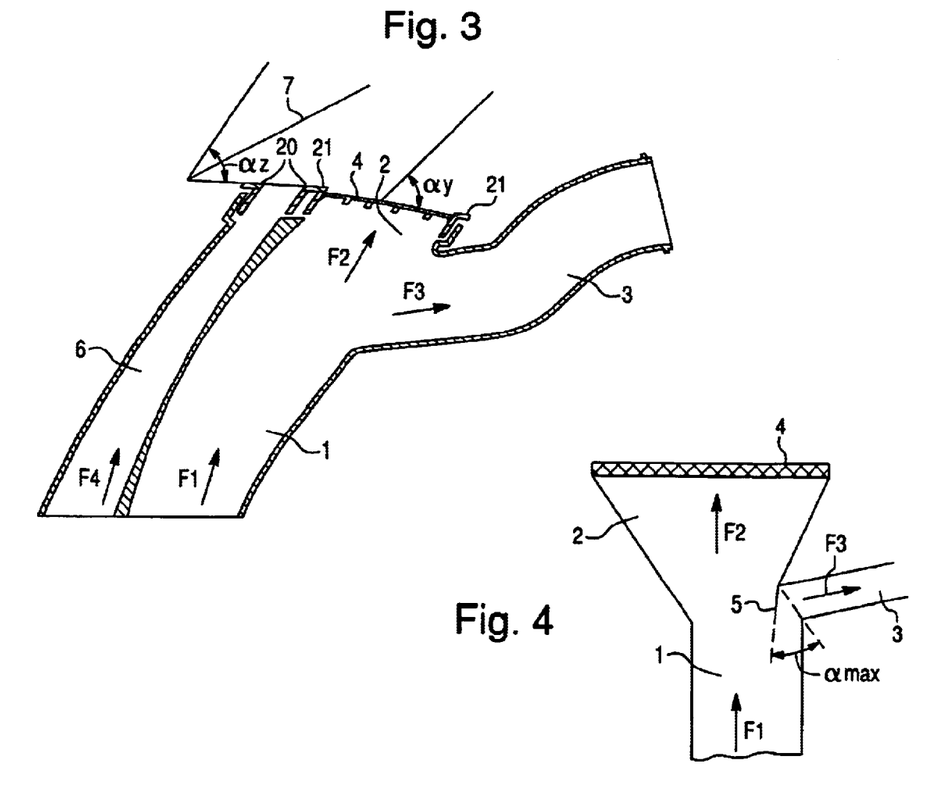
FIG. 3, a diagrammatic sectional view along the plane II—II of FIG. 2.
FIG. 4, a diagrammatic sectional view of the type illustrated in FIG. 3 of a particular embodiment of the preceding example.

As illustrated in section in FIG. 3, the gentle-diffusion duct 2, covered by an aperture 21 on which is mounted the diffusion panel 4, and the aeration duct 3 are connected in such a way as to separate the airflow F1 coming from the upstream common duct 1 into at least two air flows, respectively F2 and F3. The connection is implemented, in the embodiment example, so that the throughput of the airflow F2 of the duct 2 is approximately equal to 70% of the throughput of the common airflow, that is say lies between 50% and 95%, preferably between 60 and 80%, while the throughput of the airflow F3 is approximately 30%, and therefore lies between 50% and 5% of the throughput of the airflow F1. The airflow F4 dedicated to the de-icing is carried independently, in this embodiment example, by a duct 6 covered by an aperture 20.

The regulation of the distribution of the flows is carried out by the dimensioning of the ducts and the geometry of the connection, in particular of the diameters and of the angle of connection between the two ducts. The device may also include a flap 5 for distribution of the air throughputs of the flows F2 and F3, as illustrated in FIG. 4. The distribution flap may be a flag flap, a register of any appropriate and adjustable distribution means. Its position is controlled by any mechanical or electro-mechanical means known to the person skilled in the art.

Figure 5:
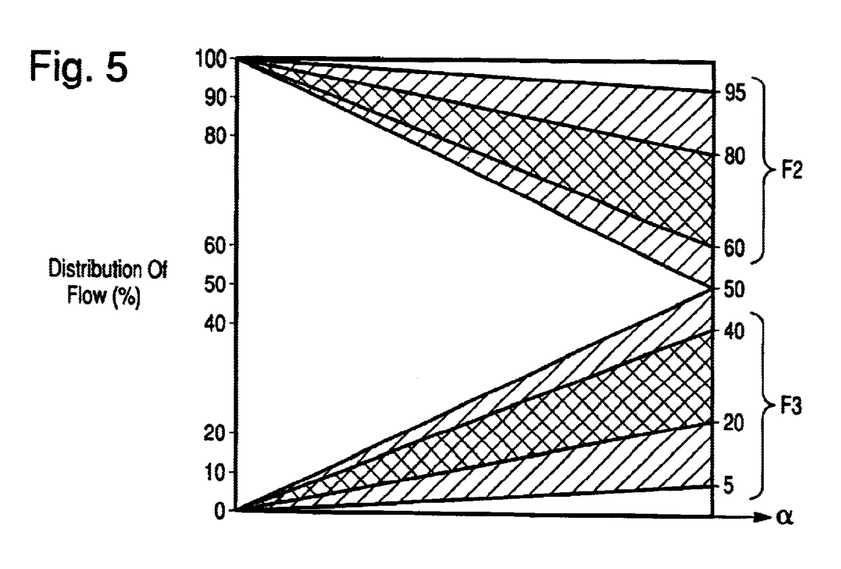
FIG. 5, a diagram of the distributions of the air throughputs as a function of the aperture of a means for regulating the throughput of an airflow for the direct aeration.

In the position of maximum opening angle of the flap 5, $\alpha_{max}$ equal to 30 degrees in the embodiment example, with respect to the closed position, positions illustrated in FIG. 4 respectively in solid and dashed lines, the distribution of the flows F2/F3 from the flow F1 is the most balanced. As illustrated by FIG. 5, the distribution in percentages of the flows varies linearly as a function of the angle of opening $\alpha$ lying between $\alpha_{max}$, following the complementary ranges of distribution values of the flows, respectively between 100% (respectively 0% for F3) and 100–0%, preferably 80–60%, for F2 respectively 5–50%, preferably 20–40%, for F3).

Figure 6:
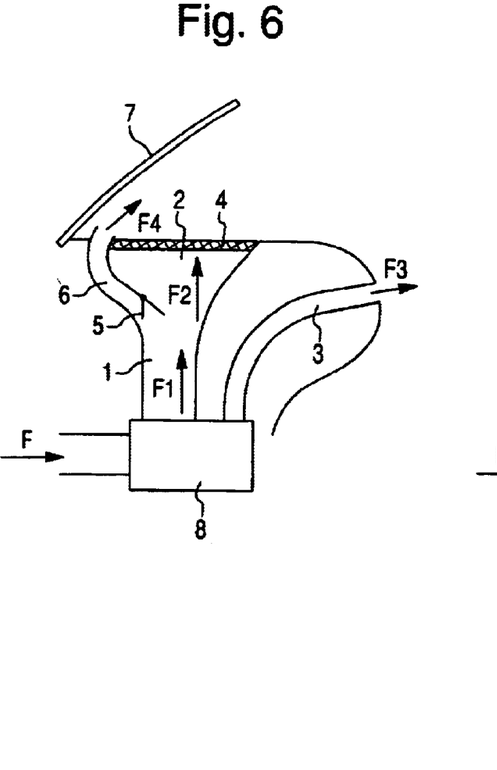
FIG. 6, a sectional view of a variant, with gentle diffusion and de-icing, of the device according to the preceding example.
Figure 7:
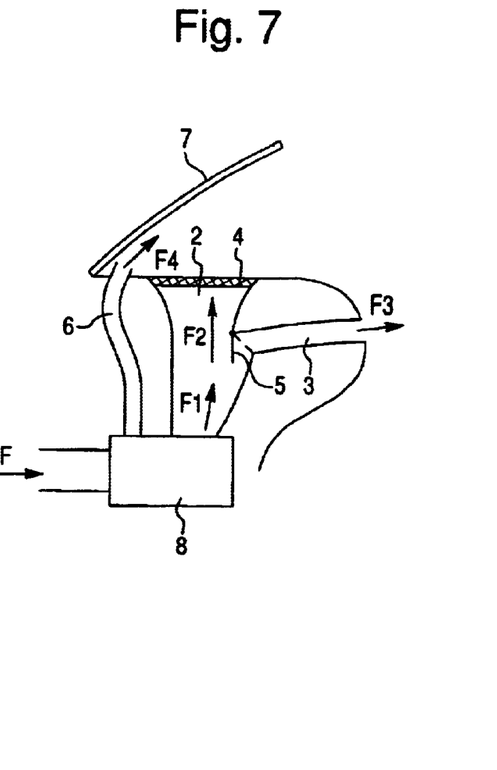
FIG. 7, a sectional view according to a particular embodiment of the preceding variant.

According to embodiment variants illustrated in section in FIGS. 6 and 7, the common duct 1 may be split by the flap 5 either into diffusion ducts 2 and de-icing ducts 6 for the windscreen 7 (FIG. 6), or into diffusion and aeration ducts 3. The common airflow F1 (FIG. 7), blown by the fan 8 using air from outside or inside the passenger compartment (arrow F), is thus used for the gentle diffusion associated respectively with the de-icing (arrow F4) or with the aeration (arrow F3). The output angle α1 of the gentle-diffusion duct (4) and therefore of the flow F2 with respect to the dashboard lies between 0° and a maximum value α2 equal to the angle of inclination of the windscreen to the dashboard increased by 30°, in order to reduce the detrimental effects associated with the phenomena of turbulence and of noise.

Figure 8:
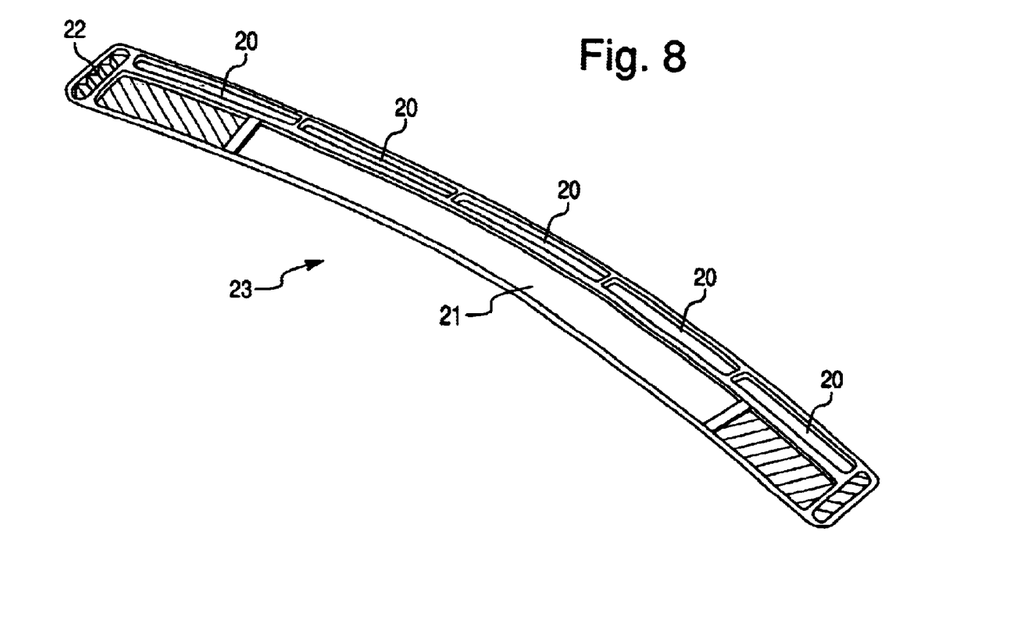
FIG. 8 is a general view of a gentle-diffusion and de-icing diffuser.

According to an embodiment example shown in FIG. 8, the apertures of the de-icing ducts 20 and the gentle-diffusion ducts 21 constitute a single trim piece 23. Optionally it includes the lateral diffusers for de-icing of the windows 22, or else also the lateral-aeration diffusers, the protection gratings (24) for the loudspeakers, or other accessories.

In another embodiment example, all the aeration ducts arise from the same junction with the common section.

Figure 9A:
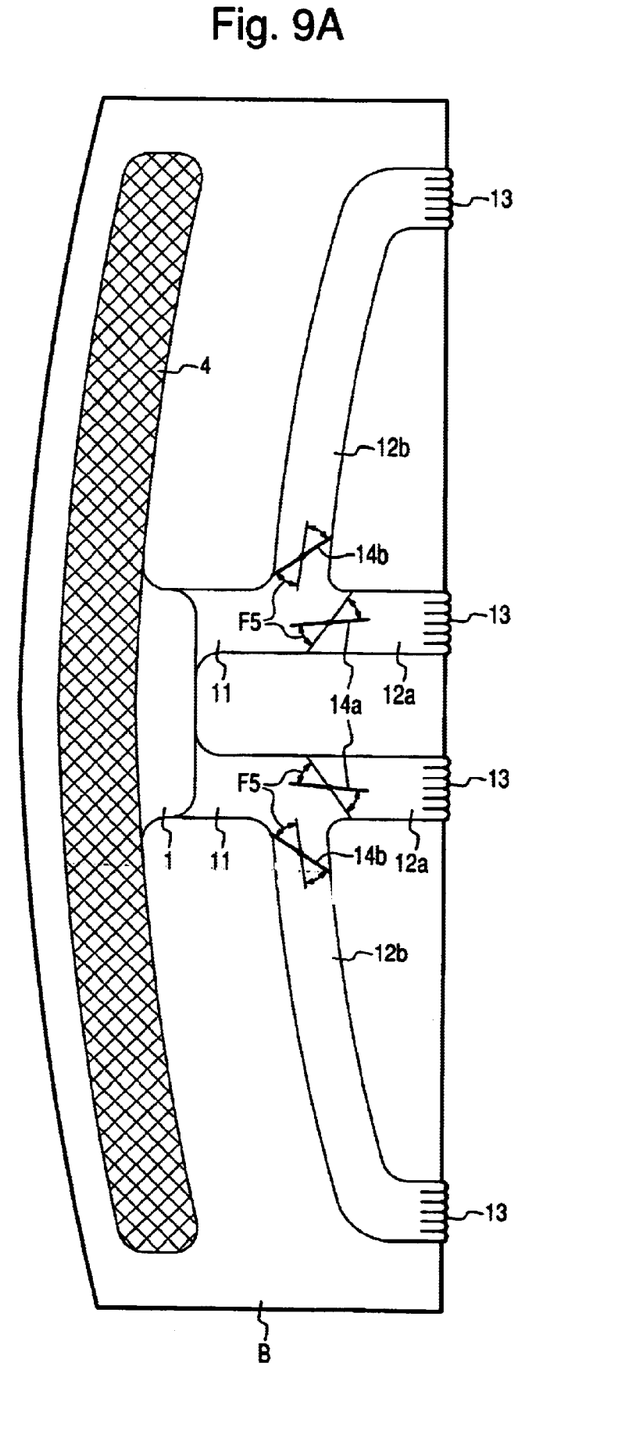
FIGS. 9a to 9c, upper partially cut-away views of variants of another example of an aeration device according to the invention.

Referring to the view in partial cut-away illustrated in FIG. 9a, two central ducts 11 are coupled to the common section 1 for the gentle diffusion, through the panel 4, and for the aeration by ventilation. In the example illustrated, the central ducts are divided into central and lateral secondary ducts, 12a and 12b, dedicated respectively to central and lateral locations on the dashboard B. The orientation nozzles 13 are arranged at the outlet of the aeration ducts.

The distribution of the air throughput is regulated at a central level, that is to say, in the example illustrated, by flaps 14a and 14b, arranged respectively at the inlet to the central and lateral ducts, and entrained in pivoting motion along the arrows F5 by any known control means. This solution makes it possible independently to regulate each air throughput of each duct.

Figure 9B:
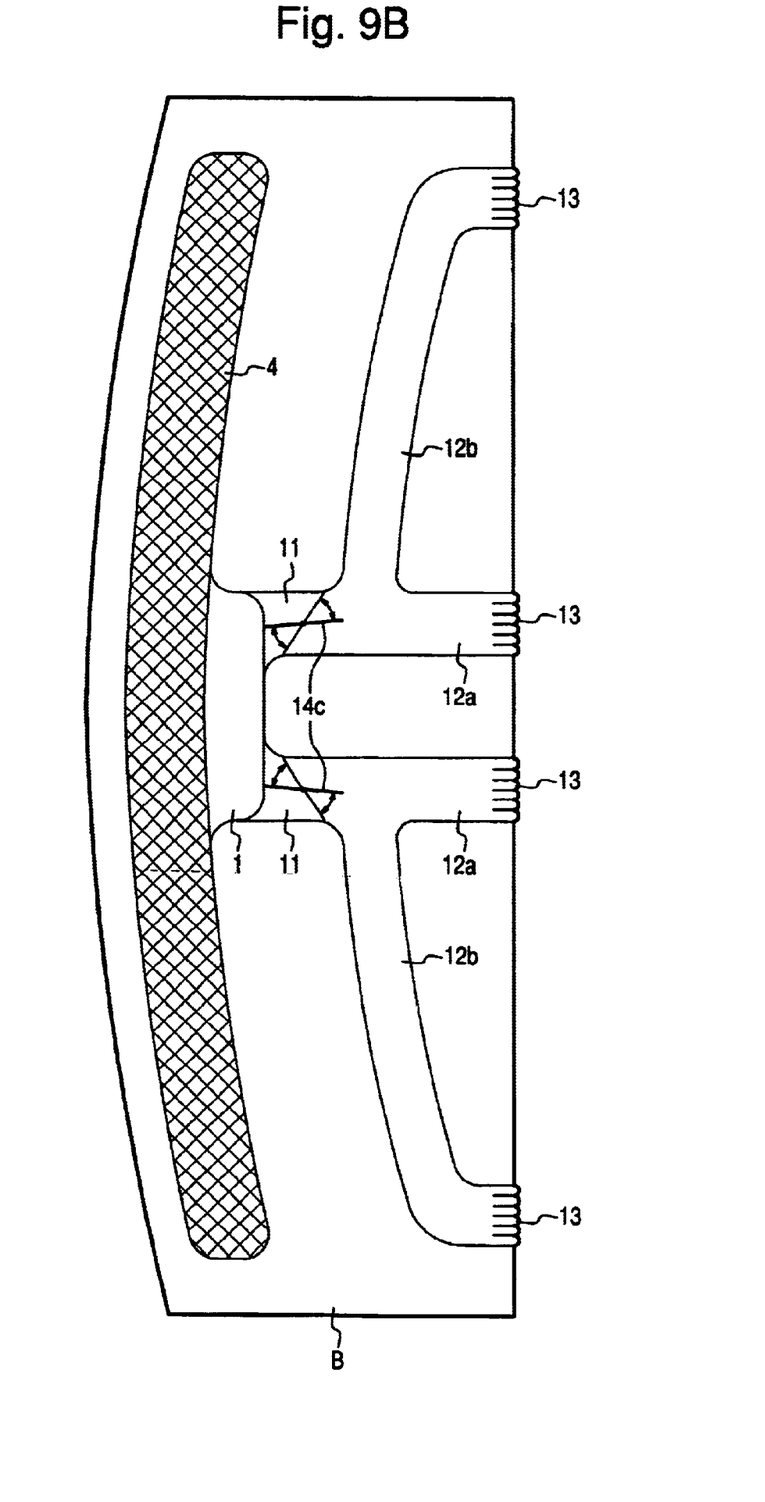
Figure 9C:
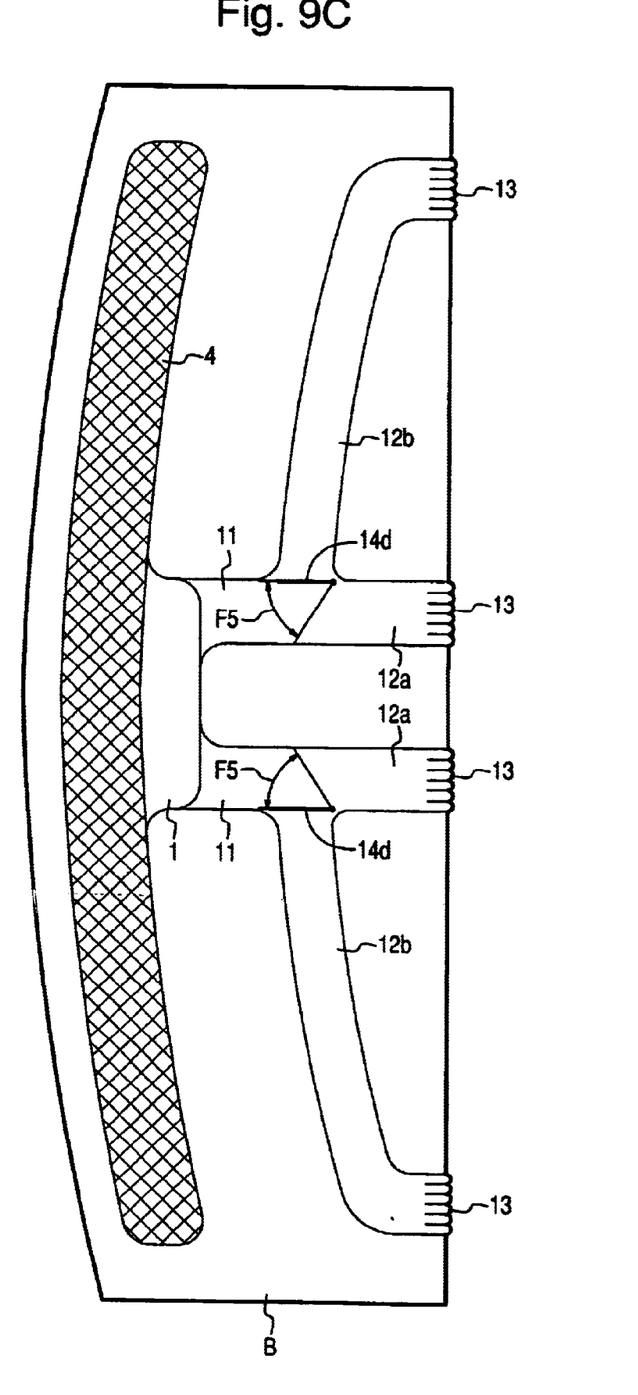

In the variants illustrated in FIGS. 9b and 9c the regulation of the air throughput is carried out either by common flaps 14c arranged in the central ducts 11 before they divide into secondary ducts 12a and 12b, that is to say in common-access control mode, or by common flaps 14d arranged for complementary distribution of air at the location of the divide, that is to say in separate-access control mode.

The panels have an oblong shape and extend transversely to the vehicle, on the dashboard. In the embodiment example, the gentle-diffusion surface of the air-permeable panel is contained substantially in a rectangle of length equal to 1.20 m, in general lying between 0.80 m and 1.60 m, and of width equal to 0.10 m, in general lying between 0.20 m and 0.03 m. Advantageously, the device includes a single gentle-diffusion panel of oblong shape, of length lying between 1 m and 1.40 m and of breadth lying between 0.2 m and 0.03 m. The area of the gentle-diffusion surface, which takes up all or part of the panel, lies between 0.04 m$^2$ and 0.40 m$^2$, and preferably between 0.04 m$^2$ and 0.15 m$^2$.

Figure 10:
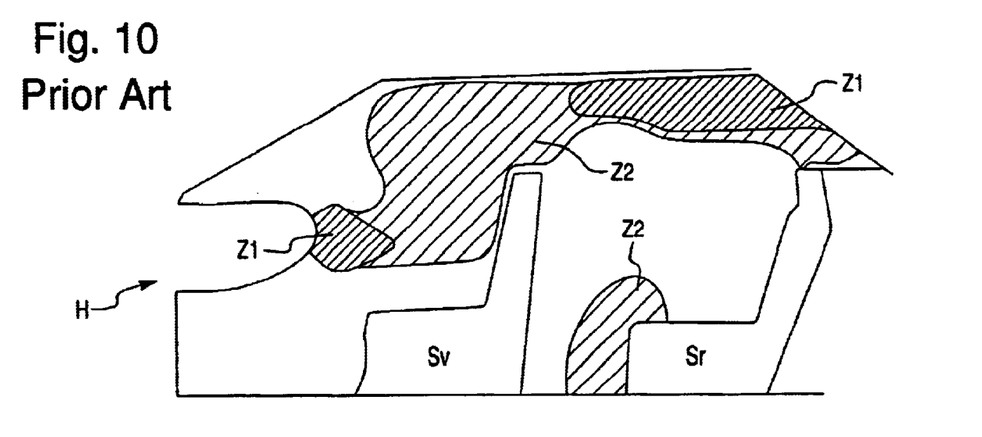
FIG. 10, a diagrammatic sectional view of a passenger compartment of a motor vehicle, with the indication of the distributions of the temperatures in the passenger compartment according to the prior art.
Figure 11:
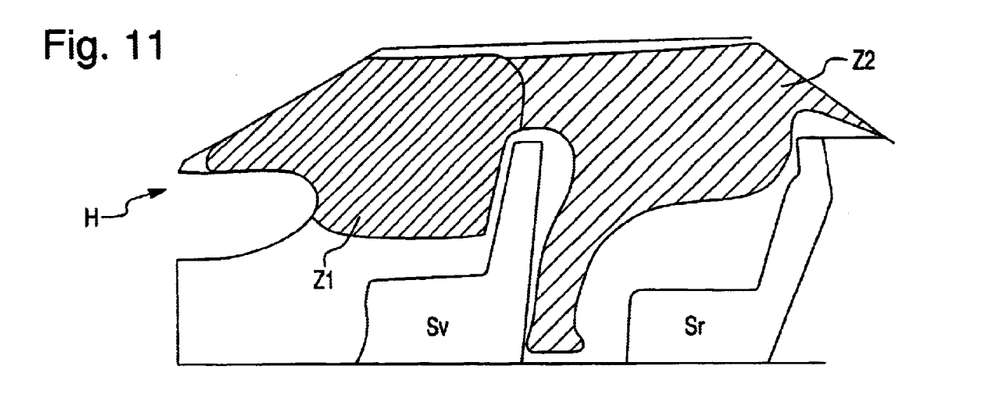
FIG. 11, a diagram according to FIG. 10 with the distributions of the temperatures in the passenger compartment obtained according to the method of the invention.

In order to illustrate the temperature distribution obtained in a passenger compartment of a motor vehicle, respectively with an aeration device according to the state of the art and with the device according to the invention, FIGS. 10 and 11 diagrammatically show a sectional view of such a passenger compartment H, with front Sv and rear Sr seats identifying the front and rear positions, and the thermal map which applies there. This is the thermal map of the passenger compartment of a vehicle 30 min after the activation of the air-conditioning, the ambient air initially being at 60° C. The zones Z1 are the coldest zones, and the zones Z2 are moderately cold zones. In the known systems, the temperature difference between Z1 and Z2 is about 6°, while the temperature difference according to the method of the invention is of the order of a degree.

It is seen in FIG. 11 that the cold accumulates essentially towards the rear seats, where the losses are substantial. In FIG. 11, the cold zones are substantially better distributed and more extensive. The coldest zone Z1 covers the front zone of the vehicle, and the moderately cold zone Z2 covers the rear zone of the vehicle.

Figure 12:
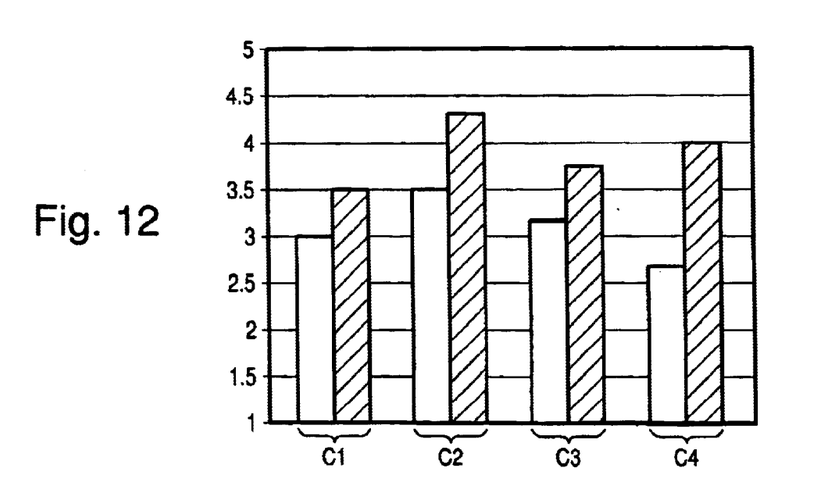
FIG. 12, a set of diagrams showing comparisons between a device according to the state of the art and a device according to the invention concerning the criteria of comfort relating to the aeration of a passenger compartment.

FIG. 12 illustrates satisfaction diagrams on a scale of coefficients going from 1 to 5, referenced by integers and fractions, with a gentle diffusion according to the method of the invention (hatched bars) and according to the conventional method (dotted bars), of four comfort criteria: C1, the response time; C2, the temperature stability; C3, the thermal comfort; C4 the comfort linked to the air speeds. It appears that all the comfort criteria have a higher satisfaction coefficient with a gentle diffusion according to the method of the invention.

The invention is not limited to the embodiment examples described and represented. It is for example possible to combine gentle-diffusion, de-icing and aeration ducts starting from the same common duct by using appropriate means for airflow distribution.

Moreover, the distribution of the air throughput can be modulated as a function of the positioning of the aeration nozzles, of the de-icing nozzles and of the diffusion holes, especially by providing a greater throughput for the zones which are close to the windows of the vehicle. In order to achieve this, the porosity of the panel can also be modulated as a function of its position according to at least one dimension of the panel, by holes with a variable cross section and/or a variable hole density.

What is claimed is:

1. Method of aeration by gentle diffusion for a ventilation, heating and/or air-conditioning installation of a passenger compartment (H) of a motor vehicle, said method comprising the steps of:
   providing the ventilation, heating and/or air-conditioning installation with at least one gentle-diffusion duct having an outlet leading to the passenger compartment;
   supplying air to the passenger compartment through the outlet of the at least one gentle-diffusion duct such that a first speed of the air exiting the outlet is substantially within a range of 1 and 5 m/s; and
   combining an aeration by directional ventilation with the aeration by gentle diffusion of the air, the installation further includes at least one aeration duct providing air for aeration at a second speed greater than said first speed by the directional ventilation, the at least one aeration duct being in fluid communication with the at least one gentle-diffusion duct.

2. The method according to claim 1, in which the throughput of air for the directional ventilation is regulated at the central level of the aeration duct.

3. The method according to claim 1, wherein the installation provides the air at the outlet of the air-diffusion panel having a speed lying between substantially 2 m/s and 4 m/s at the maximum ventilated-air throughput blown by the fan.

4. Device for aeration of a passenger compartment of a motor vehicle, the device comprising:
   at least one gentle-diffusion duct (2) for aeration by gentle diffusion of air, the diffusion duct having at its open end an air-permeable panel (4) which ensures the gentle diffusion of the air in the passenger compartment (H), and
   at last one fan provided to force the air through the at least one diffusion duct,
   wherein the device is dimensioned so that at a maximum ventilated-air throughput provided by the fan a speed of diffused air through the air-permeable panel (4) lies substantially in a range between substantially 1 and 5 m/s;

further comprising at least one aeration duct (3) for aeration by direct ventilation, the aeration duct being in fluid communication with the at least one gentle-diffusion duct, the aeration duct further having an aeration nozzle at a distal end thereof and being dimensioned so that at the maximum air throughput blown by the fan the speed of the air at the location of the aeration nozzle (10) lies substantially between 2 m/s and 10 m/s.

5. Aeration device according to claim 4, characterized in that the at least one aeration duct (3) and the at least one gentle-diffusion duct (2) are able to separate an airflow (F1) coming from a common duct (1) situated upstream into at least two secondary airflows (F2, F3) for the aeration by gentle diffusion of the passenger compartment and for the aeration by direct ventilation of the passenger compartment.

6. Aeration device according to claim 4, intended for a passenger compartment of a motor vehicle equipped with a windscreen (7), provided with the at least one gentle-diffusion duct and at least one de-icing duct (2, 6) able to separate an airflow (F1) coming from a common duct (1) situated upstream into at least two secondary airflows (F2, F4) for the aeration by gentle diffusion of the air in the passenger compartment and for de-icing of the windscreen (7).

7. Aeration device according to claim 4, in which the air ducts are provided with at least one flap and are dimensioned so that the air throughput of the duct for the gentle diffusion (2) of the passenger compartment lies between 0% and 100% of the throughput of the common duct (1), while the air throughput of the duct or ducts (3) for the aeration lies respectively between 100% and 0% of the throughput of the common duct (1).

8. Aeration device according to claim 7, in which is provided at least one flap (5) for distribution of the air throughputs of the flows (F2, F3, F4) of the ducts (2, 3, 6) for the gentle diffusion, aeration and de-icing.

9. Aeration device according to claim 8, in which the distribution in percentages of the flows varies linearly as a function of the angle of opening of the flap (5) following the complementary ranges of distribution values of the flows.

10. Aeration device according to claim 6, in which the outlet angle $\alpha 1$ of the gentle diffusion duct (4) with respect to the dashboard lies between 0° and a maximum value $\alpha 2$ equal to the angle of inclination of the windscreen to the dashboard increased by 30°.

11. Aeration device according to claim 6, in which, with the aeration by directional ventilation being carried out through at least two aeration ducts (11) coupled to the common section, each aeration duct (11) includes a flap for regulating the air throughput (14c) arranged in these ducts, substantially upstream of the outlet.

12. Aeration device according to claim 11, in which, with the aeration ducts (11) dividing into secondary ducts (12a, 12b), the throughput regulation is carried out by flaps (14c) controlling access to the secondary ducts in common mode.

13. Aeration device according to claim 11, in which, with the aeration ducts (11) dividing into secondary ducts (12a, 12b), the throughput regulation is carried out by common flaps (14d) controlling access to the secondary ducts in separate mode.

14. Aeration device according to claim 11, in which, with the aeration ducts (11) dividing into secondary ducts (12a, 12b), the throughput regulation is carried out by flaps (14a, 14b) arranged at the inlet to each secondary duct (12a, 12b).

15. Aeration device according to claim 6, in which the aperture (21) of the gentle diffusion duct constitutes a single trim piece (23) with the aperture of the de-icing duct (8) and/or with the lateral diffusers for de-icing of the windows and/or the protective gratings of the loudspeakers.

16. Aeration device according to claim 4, characterized in that the porosity of the panel is modulated as a function of its position according to at least one dimension of the panel, by holes of variable cross section and/or a variable hole density.

17. The device according to claim 4, wherein the device is dimensioned so that at the maximum ventilated-air throughput provided by the fan the speed of the diffused air through the air-permeable panel (4) lies substantially in the range between substantially 2 and 4 m/s.

18. The aeration device according to claim 4, wherein the aeration duct is dimensioned so that at the maximum air throughput blown by the fan the speed of the air at the location of the aeration nozzle (10) lies substantially between 4 m/s and 8 m/s.

* * * * *